United States Patent
Aguilar

(10) Patent No.: US 9,803,687 B2
(45) Date of Patent: Oct. 31, 2017

(54) BALL CHANNEL

(71) Applicant: Jorge Aguilar, Orinda, CA (US)

(72) Inventor: Jorge Aguilar, Orinda, CA (US)

(*) Notice: Subject to any disclaimer, the term of this patent is extended or adjusted under 35 U.S.C. 154(b) by 0 days.

(21) Appl. No.: 15/292,031

(22) Filed: Oct. 12, 2016

(65) Prior Publication Data

US 2017/0102029 A1   Apr. 13, 2017

Related U.S. Application Data

(60) Provisional application No. 62/284,827, filed on Oct. 13, 2015.

(51) Int. Cl.
| | | |
|---|---|---|
| *B65G 13/00* | (2006.01) | |
| *F16C 29/04* | (2006.01) | |
| *F16C 29/00* | (2006.01) | |
| *F16C 33/66* | (2006.01) | |

(52) U.S. Cl.
CPC .......... *F16C 29/046* (2013.01); *F16C 29/005* (2013.01); *F16C 33/6614* (2013.01); *F16C 33/6633* (2013.01); *F16C 2202/44* (2013.01); *F16C 2204/72* (2013.01)

(58) Field of Classification Search
CPC .... F16C 29/045; F16C 29/046; F16C 29/005; F16C 33/6614; F16C 33/6633; F16C 2202/44; F16C 2204/72; B65G 2207/34; B65G 39/08; B65G 39/025
USPC .................................................. 193/35 MD
See application file for complete search history.

(56) References Cited

U.S. PATENT DOCUMENTS

| | | | | |
|---|---|---|---|---|
| 3,444,973 A * | 5/1969 | Nygren | ................... | B65G 13/12 193/35 MD |
| 3,895,846 A * | 7/1975 | Edwards | ............ | B65G 21/2054 310/90.5 |
| 5,026,178 A * | 6/1991 | Ballhaus | ............... | F16C 33/416 384/446 |
| 6,371,647 B1 * | 4/2002 | Koyama | ............... | F15B 15/082 384/37 |
| 8,418,824 B2 * | 4/2013 | Aguilar | ..................... | B60L 5/36 191/22 C |
| 8,978,879 B2 * | 3/2015 | Fourney | .................. | B65G 39/04 193/35 MD |

(Continued)

OTHER PUBLICATIONS

U.S. Appl. No. 62/282,475, filed Aug. 3, 2015, Jorge Aguilar.

*Primary Examiner* — James R Bidwell
(74) *Attorney, Agent, or Firm* — Reed Smith LLP

(57) ABSTRACT

A non-magnetic ball housing can include an enclosed end and an open end. A plurality of non-magnetic ball bearings can be positioned within the enclosed end of the non-magnetic housing. A ball magnet can be adjacent to the plurality of non-magnetic ball bearings. A non-magnetic restraining plate can be coupled to the open end of the non-magnetic housing to secure the ball magnet within the non-magnetic ball housing while allowing the ball magnet to freely rotate within the non-magnetic ball housing. The non-magnetic restraining plate can include a restraining plate opening such that at least a portion of the ball magnet protrudes out of the restraining plate opening. A diameter of the restraining plate opening can be less than a diameter of the ball magnet. A metal channel can be magnetically coupled to at least a portion of the ball magnet protruding out of the restraining plate opening.

13 Claims, 2 Drawing Sheets

(56) References Cited

U.S. PATENT DOCUMENTS

| | | | | |
|---|---|---|---|---|
| 9,630,781 B1* | 4/2017 | Ogle, II | ............... | B65G 39/025 |
| 2010/0207488 A1* | 8/2010 | Ting | ...................... | H02N 2/108 |
| | | | | 310/323.06 |
| 2012/0068035 A1* | 3/2012 | Iguchi | .................. | B65G 39/025 |
| | | | | 248/346.01 |
| 2013/0006237 A1* | 1/2013 | Werner | .............. | A61B 18/1206 |
| | | | | 606/40 |
| 2013/0142468 A1* | 6/2013 | Deng | ................... | F16C 29/046 |
| | | | | 384/494 |
| 2015/0110427 A1* | 4/2015 | Berens | ................. | F16C 33/588 |
| | | | | 384/446 |
| 2016/0347178 A1* | 12/2016 | Ha | ........................ | B60K 37/06 |

* cited by examiner

BALL CHANNEL

CROSS REFERENCE TO RELATED APPLICATIONS

This application claims the benefit pursuant to 35 U.S.C. §119(e) of U.S. Provisional Application No. 62/284,827, filed Oct. 13, 2015, the disclosure of which is herein incorporated by reference in its entirety.

TECHNICAL FIELD

The present technology pertains to ball channels, and more specifically pertains to a ball channel utilizing a ball magnet.

BACKGROUND

Currently, there are several types of free rotation ball bearing assemblies known in the art. These generally include an outer housing ball, shaft or stud, cover and ball bearings, and can be known in the industry as ball transfers, caster units, or swivel ball bearings. They are often adapted for use in cargo handling systems where containers or objects are moved over transfer pallets. While effective for their intended purpose, these free rotation ball bearing assemblies rely on gravity and therefore can only be effectively used when placed beneath an item. Further, current designs do not provide for electrical applications.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The present invention is directed to a ball housing including a unique mating of two separate main parts: a free rotating ball magnet encapsulated in a non-magnetic housing assembly and a separate low carbon steel channel. The ball channel can operate when the two parts are coupled magnetically. The inside space between the channel sides at the tip can be smaller than the diameter of the ball magnet. This can permit the ball magnet to roll on the channel side inner walls or top without touching the bottom piece of the channel. The ball magnet touching the bottom piece of the channel can stop its free rolling feature. The ball magnet in the housing can attach magnetically to the sides or top of the channel. Because of the geometry the flat bottom piece of the channel (e.g., a carbon steel channel) magnetically attracts the ball magnet, but since the bottom piece of the channel (e.g., a carbon steel channel) is not in physical contact with the ball channel, this configuration permits the ball to roll attached to the channel sides. The ball magnet can be a neodymium rare earth nickel plated sphere magnet. The ball housing, stud, ball bearings and restraining plate can be made of non-magnetic materials. For electric applications, each component can include an electricity conducting non-magnetic stainless steel such as alloy 316L machined or stamped to house the ball magnet. For non-electric applications the ball housing assembly components can be the same as for electric applications, except such applications may not be connected to an electrical power source. For non-electric applications the ball housing assembly can use non-magnetic materials such as plastic. The ball bearings and the restraining plate can be made of non-magnetic stainless steel, for example in order to withstand the rolling pressures transmitted by the magnetic ball.

BRIEF DESCRIPTION OF THE DRAWINGS

The above-recited and other advantages and features of the disclosure will become apparent by reference to specific embodiments thereof which are illustrated in the appended drawings. The numbers indicated in the figures are applicable to all figures disclosed herein. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without departing from the spirit and scope of the disclosure.

Before describing the present invention in detail, it is to be understood that this invention is not limited to any particular examples provided herein of the apparatuses, system, structures or methods as such may, of course, vary. Thus, although a number of apparatus, systems and methods similar or equivalent to those described herein can be used in the practice of the present invention, the apparatuses, systems, and methods similar or equivalent to those described herein can be used in the practice of the present invention, examples of embodiments of the apparatuses, systems, and methods are described herein.

It is also to be understood that the terminology used herein is for the purpose of describing particular embodiments of the invention only and is not intended to be limiting.

Unless defined otherwise, all technical and scientific terms used herein have the same meaning as commonly understood by one having ordinary skill in the art to which the invention pertains.

Further, all publications, patents and patent applications cited herein, whether supra or infra are hereby incorporated by reference in their entirety.

Finally, as used in this specification and the appended claims, the singular "a", "an" and "the" include plural referents unless the content clearly dictates otherwise.

Figure 1:
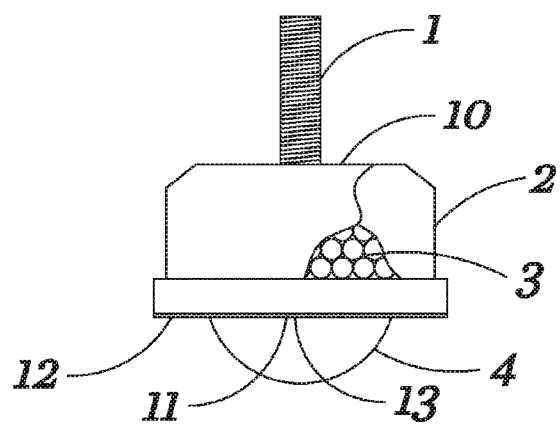
FIG. 1 shows an example of an embodiment the invention.

FIG. 1 shows an example embodiment of a ball housing assembly. As shown, a non-magnetic ball housing 2 can include an enclosed end 10 and an open end 11. The ball housing can be made of any type of non-magnetic material, such as stainless steel, plastic, etc. A connecting stud 1 can be coupled to the non-magnetic ball housing 2. The connecting stud 1 can be of any size, type or length required for its intended purpose. For example the connecting stud 1 can be a 1 inch long threaded stud.

A plurality of non-magnetic ball bearings 3 can be positioned within the enclosed end of the non-magnetic ball housing 2. For example, a ball bearing or a plurality of ball bearings 3 can be positioned within the enclosed end of the non-magnetic ball housing 2. The ball bearings 3 can be made of any non-magnetic material and be of any size required for their intended purpose. For example, the ball bearings 3 can be ⅛ inch in diameter and made of stainless steel.

A ball magnet 4 can be positioned adjacent to the plurality of non-magnetic ball bearings 3 and within the non-magnetic ball housing 2. The ball magnet 4 can be made of any magnetic material and be of any size required for their intended purpose. For example, the ball magnet 4 can be a 1 inch in diameter neodymium rare earth nickel plated sphere magnet.

Figure 1A:
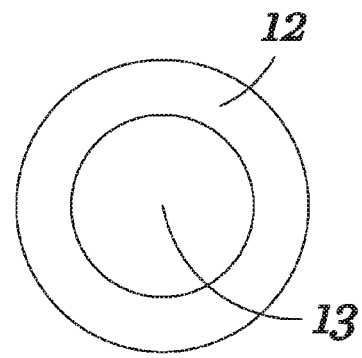
FIG. 1a shows a plan view of a restraining plate.

FIG. 1A shows a top plan view of a non-magnetic restraining plate of embodiments of the present disclosure. The non-magnetic restraining plate 12 coupled to the open end of the non-magnetic ball housing 2 can secure the ball magnet 4 within the non-magnetic ball housing 2 while allowing the ball magnet 4 to freely rotate within the non-magnetic ball housing 2. The non-magnetic restraining plate 12 can include a restraining plate opening 13 such that at least a portion of the ball magnet 4 protrudes out of the restraining plate opening. The diameter of the restraining plate opening 13 can be less than a diameter of the ball magnet 4 to secure the ball magnet 4 within the non-magnetic ball housing 2.

Figure 2:
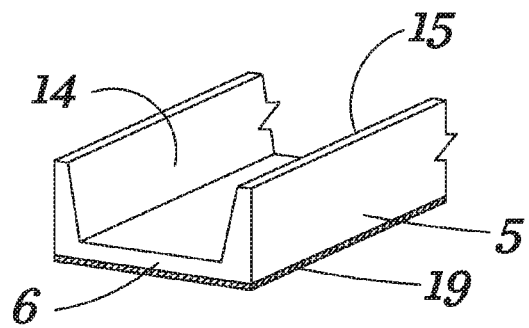
FIG. 2 shows one section of a standard off-the-shelf low carbon steel channel with a copper strip positioned on a surface of the bottom piece of the metal channel.

FIG. 2 shows an example embodiment of a metal channel. A metal channel 5 can be magnetically coupled to at least a portion of the ball magnet 4 protruding out of the restraining plate opening. The metal channel 5 can include a first wall 14 and a second wall 15 positioned on either side of a bottom piece 6 of the metal channel 5 that is substantially perpendicular to the first wall 14 and the second wall 15. A distance between the first wall and the second wall can be less than a diameter of the ball magnet 4. In some embodiments, the metal channel 5 can be made of ⅛ inch low carbon steel, be 1 inch wide with ½ inch tall walls.

For electric applications, the metal channel 5 can include a copper strip 19 positioned on a surface of the bottom piece 6 of the metal channel 5, e.g., a surface outside of the metal channel. The thickness of the copper strip 19 can be of any size and length for its intended application.

Figure 3:
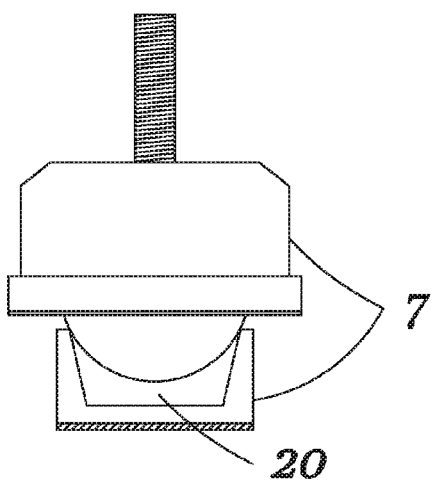
FIG. 3 shows an elevation view of an embodiment of a ball channel.

FIG. 3 shows an example of a ball channel assembly 7 includes the ball housing 2 located proximate to the metal channel 5. As shown, the ball channel assembly 7 includes a magnetic coupling of the ball housing assembly shown in FIG. 1 and the metal channel shown in FIG. 2. As shown, the ball magnet 4 does not physically contact the bottom piece 6 of the metal channel while the ball magnet 4 is magnetically coupled to the metal channel 5. The ball magnet 4 and the bottom piece 6 of the metal channel 5 are spaced apart from each other, such that there is a gap 20 between them.

Figure 4:
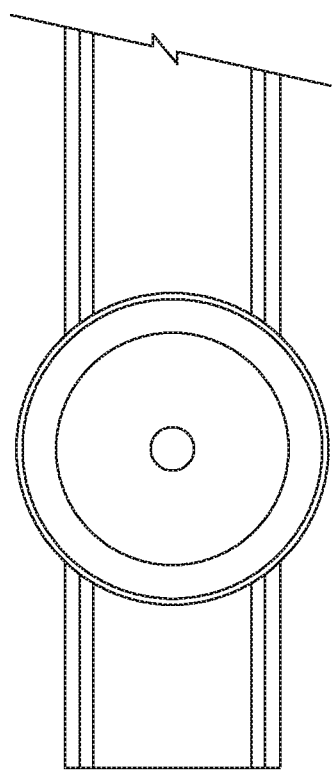
FIG. 4 shows a plan view of an embodiment of a ball channel depicted in FIG. 3.

FIG. 4 shows a top view of the ball channel assembly 7 shown in FIG. 3. The length of the channel 5 is as needed for the application.

Figure 5:
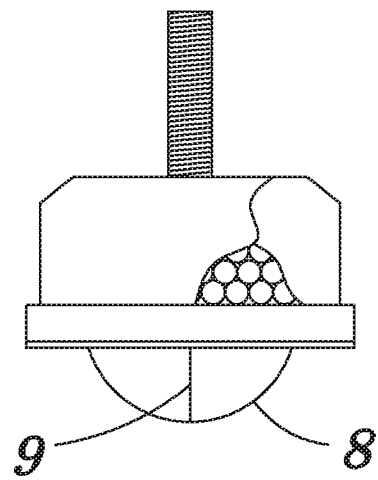
FIG. 5 shows a ball housing assembly with a ball magnet protected from wear by two non-magnetic metallic half shells positioned on an outer surface of on the outside surface of a magnet ball.

FIG. 5 shows another example of a ball housing 2 for an electric application. As shown the ball housing 2 includes a free rotating ⅞ inch neodymium rare earth nickel plated sphere magnet 8 magnetized to approximately 8815 Gauss and covered with two 1/16 inch thick magnetic stainless steel alloy 316L half shells 8 positioned on an outer surface of the ⅞ inch neodymium ball magnet and circumferentially welded or glued together 9 to form a 1 inch in diameter ball magnet mounted inside a ball channel assembly 7 riding on a 1 inch wide, ½ inch high legs low carbon steel channel 5 of a length as needed for the application. The purpose of the approximately 1/16 inch thick stainless steel half shells 8 is for the neodymium ball to retain its magnetic properties and to preserve its magnetic materials when it is used frequently as in electric roadways. The ball housing 2 includes a solid metal non-magnetic stainless steel such as alloy 316L machined to house the sphere and a bed of a plurality (e.g., approximately 80) ball bearing balls 3, ⅛ inch in diameter made of the same non-magnetic material as the housing. The machined one piece housing can include a 5/16 inch 18 UNC threaded inch long stud for attachment of the ball housing 2 to the contact mechanism and for electrical connection to the electrical circuit and for physical attachment to the remaining isolated contact mechanism.

In some embodiments of the invention the composition of the half shells 8 described above may be brass, aluminum, copper, copperweld, or any other electrically conducting non-magnetic materials that endure the stresses of the rolling ball contact with the carbon steel channel at high speeds.

Figure 6:
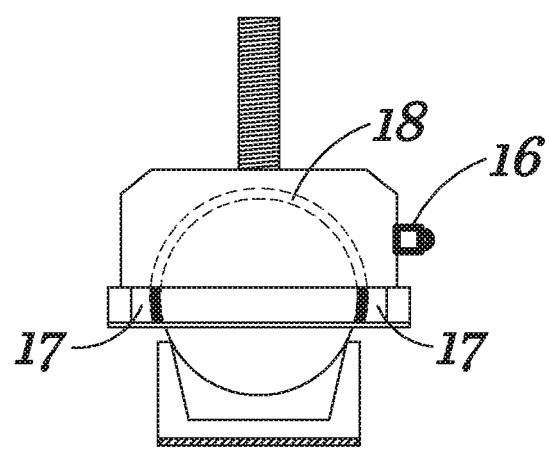
FIG. 6 shows an embodiment of that includes a lubricating plug and a grease seal.

FIG. 6 shows an example of the ball channel used in electrified roads provided with a lubricating plug 16 on the side of the one piece stainless steel housing 2 and a grease seal 17 below the restraining plate 12 and the ball bearing enclosure 18 filled with conductive lubricating grease to reduce overheating of the ball magnet in accordance with some embodiments of the invention.

In some embodiments, the magnetic ball with or without the half shells can be readily removed and replaced when desired in the housing assembly.

In some embodiments, the size of the magnetic ball, housing, stud, bearing balls, restraining plate, restraining plate opening, carbon steel channel, both for the electric type and the non-electric application can be smaller or larger than the sizes described above as may be needed for the application.

In some embodiments, the operating voltage of the ball channel can be alternating current (AC) or direct current (DC) and the voltage level can vary from 120 volts ac to 600 vac and from 12 vdc to 600 vdc.

In some embodiments, the ball housing can be used for hanging sliding items such as curtains, closet doors, shower doors and the like. The ball housing can include a free rotating 1 inch diameter rare earth nickel plated sphere magnet magnetized to approximately 8815 Gauss mounted inside a ball housing 2. The magnetic fixture can include a solid non-magnetic stainless steel such as alloy 316L machined to house the sphere magnet and a bed of approximately 80 ball bearings ⅛ inch in diameter made of the same non-magnetic material as the housing. A metal hardened and restraining plate of similar composition as the housing can maintain the plurality of ball bearings in place inside the housing. The plate can contain a ⅞ inch circular aperture for the captured 1 inch sphere to rotate in place and partially protrude for physical contact with the track channel. The machined one piece housing can include a 5/16 inch 18 UNC threaded 1 inch long stud for attachment of the ball housing 2 to heavy curtains, closet doors, shower doors, and the like. The accompanying track channel can be 1 inch wide by ½ inch high sides, ⅛ inch thick low carbon steel channel of a length as needed for the application.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features, steps or acts. For example, such functionality can be distributed differently or performed in components other than those identified herein. Rather, the described features and steps are disclosed as examples of components of systems and methods within the scope of the appended claims.

The invention claimed is:

1. A ball channel comprising:
a non-magnetic ball housing including an enclosed end and an open end;
a plurality of non-magnetic ball bearings positioned within the enclosed end of the non-magnetic housing;
a ball magnet positioned adjacent to the plurality of non-magnetic ball bearings;
a non-magnetic restraining plate coupled to the open end of the non-magnetic ball housing to secure the ball magnet within the non-magnetic ball housing while allowing the ball magnet to freely rotate within the non-magnetic ball housing, the non-magnetic restraining plate comprising a restraining plate opening such that at least a portion of the ball magnet protrudes out of the restraining plate opening, wherein a diameter of the restraining plate opening is less than a diameter of the ball magnet; and
a metal channel magnetically coupled to at least a portion of the ball magnet protruding out of the restraining plate opening.

2. The ball channel of claim 1, wherein the metal channel includes a first wall and a second wall positioned on either side of a bottom piece substantially perpendicular to the first wall and the second wall, wherein a distance between the first wall and the second wall is less than a diameter of the ball magnet.

3. The ball channel of claim 2, wherein there is a gap between the ball magnet and the bottom piece of the metal channel while the ball magnet is magnetically coupled to the metal channel.

4. The ball channel of claim 2, wherein the metal channel comprises a copper strip positioned on the bottom piece of the metal channel.

5. The ball channel of claim 1, wherein at least a portion of the metal channel comprises carbon steel.

6. The ball channel of claim 1, further comprising:
a lubricating plug positioned on a side of the non-magnetic ball housing; and
a grease seal positioned adjacent to at least one end of the restraining plate, wherein the non-magnetic ball housing contains a lubricant.

7. The ball channel of claim 6, wherein the lubricant is a conductive grease.

8. The ball channel of claim 1, further comprising a connecting stud coupled to the non-magnetic ball housing.

9. The ball channel of claim 1, wherein at least a portion of the non-magnetic ball housing comprises plastic.

10. The ball channel of claim 1, wherein at least one of the plurality of non-magnetic ball bearings comprises stainless steel.

11. The ball channel of claim 1, wherein at least a portion of the non-magnetic restraining plate comprises stainless steel.

12. The ball channel of claim 1, wherein the ball magnet comprises a neodymium rare earth nickel plated sphere magnet.

13. The ball channel of claim 1, wherein the non-magnetic ball housing and the ball magnet in contact with the metal channel form an electrical contact for the transfer of current and voltage.

* * * * *